United States Patent
Wang et al.

(10) Patent No.: US 10,897,531 B2
(45) Date of Patent: Jan. 19, 2021

(54) MESSAGE OBTAINING METHOD AND APPARATUS

(71) Applicant: HUAWEI TECHNOLOGIES CO., LTD., Shenzhen (CN)

(72) Inventors: Min Wang, Xi'an (CN); Feng Chen, Xi'an (CN); Shufeng Wang, Xi'an (CN); Yongpan Xu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/604,406

(22) PCT Filed: Apr. 11, 2017

(86) PCT No.: PCT/CN2017/080105
§ 371 (c)(1),
(2) Date: Oct. 10, 2019

(87) PCT Pub. No.: WO2018/187940
PCT Pub. Date: Oct. 18, 2018

(65) Prior Publication Data
US 2020/0059547 A1 Feb. 20, 2020

(51) Int. Cl.
*H04M 1/72* (2006.01)
*H04M 1/725* (2006.01)
*G06F 3/16* (2006.01)
*H04B 1/3827* (2015.01)

(52) U.S. Cl.
CPC ............ *H04M 1/7255* (2013.01); *G06F 3/16* (2013.01); *H04B 1/385* (2013.01); *H04M 1/7253* (2013.01); *H04B 2001/3861* (2013.01); *H04B 2001/3866* (2013.01)

(58) Field of Classification Search
CPC combination set(s) only.
See application file for complete search history.

(56) References Cited

U.S. PATENT DOCUMENTS

| | | | |
|---|---|---|---|
| 7,650,170 B2 | 1/2010 | May et al. | |
| 7,890,128 B1* | 2/2011 | Thomas | H04M 3/436 455/466 |
| 8,213,666 B2* | 7/2012 | Groesch | H04R 5/033 381/376 |
| 9,277,310 B1* | 3/2016 | Nohr | H04R 1/1041 |
| 2005/0192061 A1 | 9/2005 | May et al. | |
| 2009/0233550 A1* | 9/2009 | Ryu | H04W 28/18 455/41.2 |

(Continued)

FOREIGN PATENT DOCUMENTS

| | | |
|---|---|---|
| CN | 103546629 A | 1/2014 |
| CN | 104218963 A | 12/2014 |

(Continued)

*Primary Examiner* — Junpeng Chen
(74) *Attorney, Agent, or Firm* — Stein IP, LLC

(57) ABSTRACT

A data channel and an audio channel may be established between a wearable device and a terminal. When being in the earphone mode, the wearable device notifies the terminal of a current status, and receives and plays the voice message that is obtained by converting the text message and that is sent by the terminal, thereby overcoming an insufficient screen display capability of the wearable device, and enabling a user to conveniently check content of the text message in time.

23 Claims, 8 Drawing Sheets

(56) References Cited

U.S. PATENT DOCUMENTS

| | | | |
|---|---|---|---|
| 2010/0122167 A1 | 5/2010 | Ryu | |
| 2012/0242473 A1* | 9/2012 | Choi | B60W 50/14 340/441 |
| 2012/0244801 A1* | 9/2012 | Lau | H04B 5/0006 455/41.1 |
| 2014/0018053 A1 | 1/2014 | Cho et al. | |
| 2016/0073200 A1* | 3/2016 | Yoo | H04R 5/0335 381/311 |
| 2016/0344436 A1 | 11/2016 | Oh | |
| 2019/0226875 A1* | 7/2019 | Li | G01D 5/145 |

FOREIGN PATENT DOCUMENTS

| | | | | |
|---|---|---|---|---|
| CN | 204046782 U | * | 12/2014 | H04M 1/7255 |
| CN | 204190820 U | | 3/2015 | |
| CN | 104868932 A | | 8/2015 | |
| JP | 2005191766 A | | 7/2005 | |

\* cited by examiner

MESSAGE OBTAINING METHOD AND APPARATUS

CROSS-REFERENCE TO RELATED APPLICATIONS

This application is a national stage of International Application No. PCT/CN2017/080105, filed on Apr. 11, 2017, which is hereby incorporated by reference in its entirety.

TECHNICAL FIELD

Aspects of this application relate to the field of communications technologies, and in particular, to a message obtaining method for a terminal, and an apparatus.

BACKGROUND

With development of electronic technologies, wearable devices have improving hardware configurations and increasingly rich functions. A step counting function and a vibration reminder function are provided on a wearable device in early days. Nowadays, a wearable device is equipped with a display screen and an intelligent operating system. In addition to conventional functions, a wearable device can be further connected to the Internet by using a smartphone or a home network to display content such as time, incoming call information, Short Messaging Service messages, e-mails, news, and weather information and support voice calls.

However, on one hand, because a wearable device needs to be light and small, the wearable device has a relatively small display screen with a limited single-screen display capability, making it difficult to display and read a text message. On the other hand, in a car driving scenario or the like, it is inconvenient for a user to read a text message, so the user cannot browse content of a text message on a smartphone or a wearable device in time. Therefore, a method that can improve a display capability of a wearable device and facilitate timely reading of a text message is required.

SUMMARY

Aspects of this application describe a message obtaining method and an apparatus, to resolve the foregoing problem that exists in the prior art.

According to a first aspect, a message obtaining method is provided. The method includes: determining, by a wearable device, whether the wearable device is in an earphone mode; when the wearable device is in the earphone mode, notifying, by the wearable device, a terminal that the wearable device can receive a voice message; and receiving, by the wearable device, a voice message sent by the terminal, where the voice message is obtained by converting a text message by the terminal. By receiving and playing the voice message that is obtained by converting the text message and that is sent by the terminal, the wearable device can overcome an insufficient screen display capability, and enable a user to conveniently check content of the text message in time.

In a possible design of the first aspect, the determining, by a wearable device, whether the wearable device is in an earphone mode includes: determining, by the wearable device by using a Hall effect sensor, whether the wearable device is in the earphone mode. In this way, a wearing status of the wearable device can be detected.

In a possible design of the first aspect, the method further includes: sending, by the wearable device, a request for establishing an audio channel to the terminal; and receiving, by the wearable device, a response that is of confirming establishment of the audio channel and that is sent by the terminal. In this way, the wearable device can establish the audio channel to the terminal, and receive, by using the audio channel, voice information sent by the terminal.

In a possible design of the first aspect, the method further includes: sending, by the wearable device, a request for establishing an audio channel to the terminal; receiving, by the wearable device, a response that is of confirming establishment of the audio channel and that is sent by the terminal; and sending, by the wearable device, a text message index to the terminal. In this way, the wearable device can establish the audio channel to the terminal, and receive, by using the audio channel, voice information corresponding to the text message index.

In a possible design of the first aspect, the text message is a text message corresponding to the text message index. In this way, when entering the earphone mode from a non-earphone mode, the wearable device can check, by using the text message index, the text message received by the terminal.

In a possible design of the first aspect, the text message includes a text message received or pre-stored by the terminal. In this way, the terminal can convert the received or pre-stored text message into the voice message.

In a possible design of the first aspect, the method further includes: receiving, by the wearable device, a text message index sent by the terminal, where the text message index is created by the terminal based on the text message. By receiving the text message index sent by the terminal, the wearable device can store the text message index in the non-earphone mode, and when entering the earphone mode, obtain the voice message corresponding to the text message index.

In a possible design of the first aspect, the audio channel includes an Advanced Audio Distribution Profile A2DP audio channel. The wearable device can receive a high-quality voice message by using the A2DP audio channel.

According to a second aspect, a message obtaining method is provided. The method includes: receiving, by the terminal, a notification that is sent by a wearable device and that indicates that the wearable device can receive a voice message; converting, by the terminal, a text message into a voice message; and sending, by the terminal, the voice message to the wearable device. By converting the text message into the voice message, the wearable device can overcome an insufficient screen display capability, and enable a user to conveniently check content of the text message in time.

In a possible design of the second aspect, the notification indicating that the wearable device can receive a voice message is sent by the wearable device when the wearable device determines that the wearable device is in an earphone mode. In this way, the terminal can obtain that the wearable device is in an earphone wearing state.

In a possible design of the second aspect, the method further includes: receiving, by the terminal, a request for establishing an audio channel sent by the wearable device; and sending, by the terminal, a response of confirming establishment of the audio channel to the wearable device. In this way, the terminal can establish the audio channel to the wearable device, and send voice information to the wearable device by using the audio channel.

In a possible design of the second aspect, the method further includes: receiving, by the terminal, a request for establishing an audio channel sent by the wearable device; sending, by the terminal, a response of confirming establishment of the audio channel to the wearable device; and receiving, by the terminal, a text message index sent by the wearable device. In this way, the terminal can establish the audio channel to the wearable device, convert a text message corresponding to the text message index into the voice message, and send voice information to the wearable device by using the audio channel.

In a possible design of the second aspect, the text message is a text message corresponding to the text message index. In this way, when entering the earphone mode from a non-earphone mode, the wearable device can check, by using the text message index, the text message received by the terminal.

In a possible design of the second aspect, the text message includes a text message received or pre-stored by the terminal. In this way, the terminal can convert the received or pre-stored text message into the voice message.

In a possible design of the second aspect, the method further includes: sending, by the terminal, a text message index to the wearable device, where the text message index is created by the terminal based on the text message. By converting the text message into the text message index, the terminal can store the text message when the wearable device is in the non-earphone mode, and send the voice message corresponding to the text message index to the wearable device when the wearable device enters the earphone mode.

In a possible design of the second aspect, the audio channel includes an Advanced Audio Distribution Profile A2DP audio channel. The wearable device can receive a high-quality voice message by using the A2DP audio channel.

According to a third aspect, a wearable device is provided. The wearable device includes: a determining module, configured to determine whether the wearable device is in an earphone mode; a notification module, configured to: when the wearable device is in the earphone mode, notify, by the wearable device, a terminal that the wearable device can receive a voice message; and a receiving module, configured to receive a voice message sent by the terminal, where the voice message is obtained by converting a text message by the terminal. By receiving and playing the voice message that is obtained by converting the text message and that is sent by the terminal, the wearable device can overcome an insufficient screen display capability, and enable a user to conveniently check content of the text message in time.

In a possible design of the third aspect, the determining module is configured to determine, by using a Hall effect sensor, whether the wearable device is in the earphone mode. In this way, a wearing status of the wearable device can be detected.

In a possible design of the third aspect, the wearable device further includes: a sending module, configured to send a request for establishing an audio channel to the terminal, where the receiving module is further configured to receive a response that is of confirming establishment of the audio channel and that is sent by the terminal. In this way, the wearable device can establish the audio channel to the terminal, and receive, by using the audio channel, voice information sent by the terminal.

In a possible design of the third aspect, the wearable device further includes: a sending module, configured to send a request for establishing an audio channel and a text message index to the terminal, where the receiving module is further configured to receive a response that is of confirming establishment of the audio channel and that is sent by the terminal. In this way, the wearable device can establish the audio channel to the terminal, and receive, by using the audio channel, voice information corresponding to the text message index.

In a possible design of the third aspect, the text message is a text message corresponding to the text message index. In this way, when entering the earphone mode from a non-earphone mode, the wearable device can check, by using the text message index, the text message received by the terminal.

In a possible design of the third aspect, the text message includes a text message received or pre-stored by the terminal. In this way, the terminal can convert the received or pre-stored text message into the voice message. By receiving the text message index sent by the terminal, the wearable device can store the text message index in the non-earphone mode, and when entering the earphone mode, obtain the voice message corresponding to the text message index.

In a possible design of the third aspect, the wearable device further includes: the receiving module is further configured to receive a text message index sent by the terminal, where the text message index is created by the terminal based on the text message.

In a possible design of the third aspect, the audio channel includes an Advanced Audio Distribution Profile A2DP audio channel. The wearable device can receive a high-quality voice message by using the A2DP audio channel.

According to a fourth aspect, a terminal is provided. The terminal includes: a receiving module, configured to receive a notification that is sent by a wearable device and that indicates that the wearable device can receive a voice message; a conversion module, configured to convert a text message into a voice message; and a sending module, configured to send the voice message to the wearable device. By converting the text message into the voice message, the wearable device can overcome an insufficient screen display capability, and enable a user to conveniently check content of the text message in time.

In a possible design of the fourth aspect, the notification indicating that the wearable device can receive a voice message is sent by the wearable device when the wearable device determines that the wearable device is in an earphone mode. In this way, the terminal can obtain that the wearable device is in an earphone wearing state.

In a possible design of the fourth aspect, the terminal further includes: the receiving module is further configured to receive a request for establishing an audio channel sent by the wearable device; and the sending module is further configured to send a response of confirming establishment of the audio channel to the wearable device. In this way, the terminal can establish the audio channel to the wearable device, and send voice information to the wearable device by using the audio channel.

In a possible design of the fourth aspect, the terminal further includes: the receiving module is further configured to receive a request for establishing an audio channel and a text message index that are sent by the wearable device; and the sending module is further configured to send a response of confirming establishment of the audio channel to the wearable device. In this way, the terminal can establish the audio channel to the wearable device, convert a text message corresponding to the text message index into the voice message, and send voice information to the wearable device by using the audio channel.

In a possible design of the fourth aspect, the text message is a text message corresponding to the text message index. In this way, when entering the earphone mode from a non-earphone mode, the wearable device can check, by using the text message index, the text message received by the terminal.

In a possible design of the fourth aspect, the text message includes a text message received or pre-stored by the terminal. In this way, the terminal can convert the received or pre-stored text message into the voice message.

In a possible design of the fourth aspect, the terminal further includes: the sending module is further configured to send a text message index to the wearable device, where the text message index is created by the terminal based on the text message. By converting the text message into the text message index, the terminal can store the text message when the wearable device is in the non-earphone mode, and send the voice message corresponding to the text message index to the wearable device when the wearable device enters the earphone mode.

In a possible design of the fourth aspect, the audio channel includes an Advanced Audio Distribution Profile A2DP audio channel. The wearable device can receive a high-quality voice message by using the A2DP audio channel.

According to a fifth aspect, a wearable device is provided. The wearable device includes one or more processors, a memory, a transmitter, a receiver, and one or more programs, the one or more programs are stored in the memory and are configured to be performed by the one or more processors, and the one or more programs include an instruction used for performing the method according to the first aspect.

According to a sixth aspect, a terminal is provided. The wearable device includes one or more processors, a memory, a transmitter, a receiver, and one or more programs, the one or more programs are stored in the memory and are configured to be performed by the one or more processors, and the one or more programs include an instruction used for performing the method according to the second aspect.

According to a fifth aspect, a computer program product including an instruction is provided. When being run on a computer, the instruction enables the computer to perform the method according to the first aspect or the second aspect.

According to a sixth aspect, a computer readable storage medium is provided. The computer readable storage medium stores an instruction, and when being run on a computer, the instruction enables the computer to perform the method according to the first aspect or the second aspect.

BRIEF DESCRIPTION OF DRAWINGS

To describe the technical solutions in the embodiments of the present invention more clearly, the following briefly describes the accompanying drawings required for describing the embodiments. Apparently, the following accompanying drawings reflect only some embodiments but not all embodiments of the present invention. A person of ordinary skill in the art may further obtain other implementations based on the accompanying drawings without creative labor. However, all the embodiments or implementations fall within the protection scope of this application.

DESCRIPTION OF EMBODIMENTS

The following further describes technical solutions in embodiments of the present invention with reference to the accompanying drawings in the embodiments of the present invention.

A message obtaining method and an apparatus according to embodiments of the present invention may be applied to any terminal having a screen and a plurality of application programs. The apparatus may be hardware, software, or a combination of software and hardware that is installed in the terminal and that has a processing capability. The terminal may be a terminal such as a mobile phone or a cellular phone, a tablet personal computer (Tablet Personal Computer, TPC), a laptop computer (Laptop Computer), a digital camera, a digital video camera, a projection device, a wearable device (Wearable Device), a personal digital assistant (Personal Digital Assistant, PDA), an e-book reader (e-book reader), a virtual reality intelligent device, a digital broadcast terminal, a message transceiver device, a game console, a medical device, a fitness facility, or a scanner. The terminal may establish communication with a network by using a 2G, 3G, 4G, 5G, or a wireless local area network (wireless locals access network, WLAN). For convenience and brevity, this is not further limited in the embodiments of the present invention, and descriptions are provided in the following embodiments by using a mobile terminal as an example.

Figure 1:
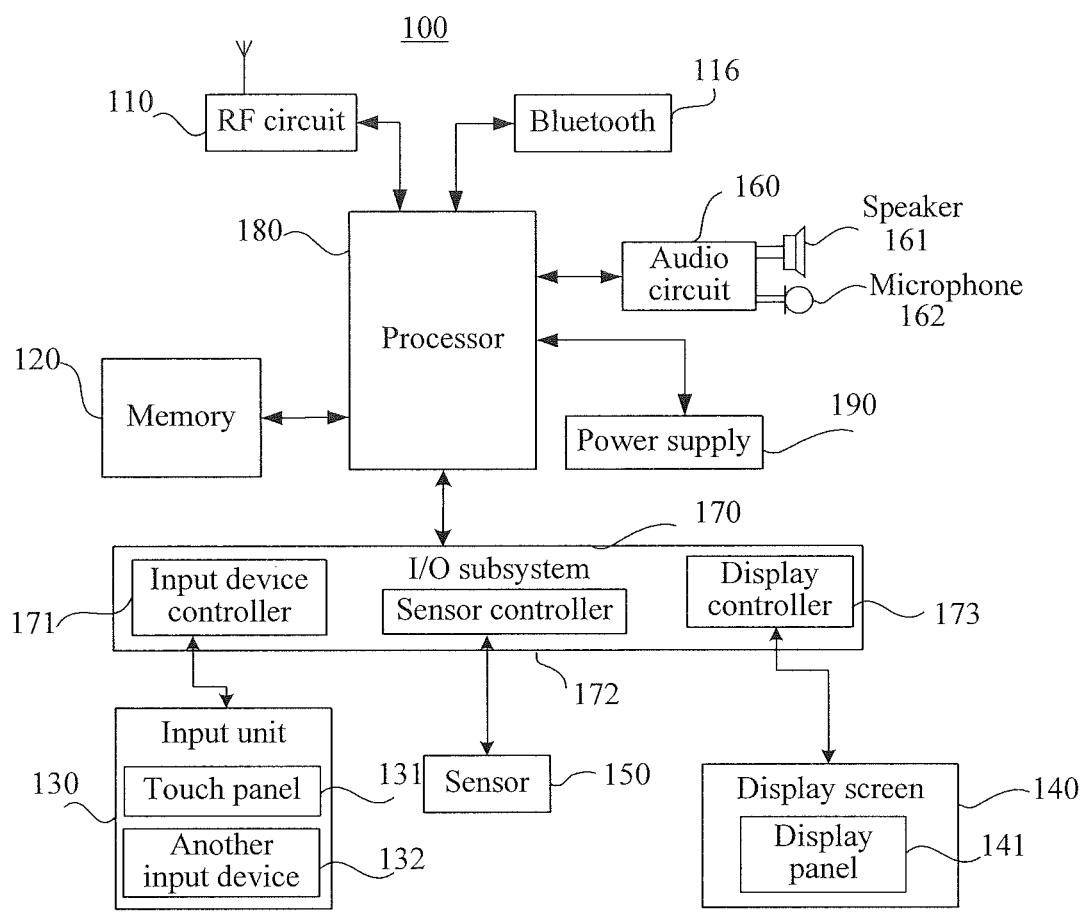
FIG. 1 is a schematic structural diagram of a first terminal according to an embodiment of the present invention.

An embodiment of the present invention provides a terminal. The terminal may be configured to perform the method in the embodiments of the present invention. Using an example in which the terminal is a mobile phone, FIG. 1 is a schematic structural diagram of a mobile phone 100. The following specifically describes components of the mobile phone 100 with reference to FIG. 1. The mobile phone 100 includes components such as a radio frequency (Radio Frequency, RF) circuit 110, a Bluetooth module 116, a memory 120, an input device 130, a display screen 140, a sensor 150, an audio circuit 160, an input/output (Input/Output, I/O) subsystem 170, a processor 180, and a power supply 190. A person skilled in the art may understand that the structure of the mobile phone shown in FIG. 1 is only used as an example of implementation manners and does not constitute a limitation on the mobile phone, and the mobile phone may include more components or fewer components than those shown in the figure, or some components may be combined, or a different component deployment may be used.

An RF circuit 110 may be configured to receive and send information and receive and send a signal during a call process. Specifically, the RF circuit 110 receives downlink information from a base station, then delivers the downlink information to a processor 180 for processing, and sends related uplink data to the base station. Usually, the RF circuit includes, but is not limited to, an antenna, at least one amplifier, a transceiver, a coupler, a low noise amplifier (Low Noise Amplifier, LNA), a duplexer, and the like. In addition, the RF circuit 110 may also communicate with a network and another device through wireless communication. The wireless communication may use any communications standard or protocol, which includes, but is not limited to, Global System for Mobile Communications (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), e-mail, Short Messaging Service (Short Messaging Service, SMS), and the like.

The Bluetooth module 116 may be used for short-range wireless data transmission and voice transmission. When the mobile phone 100 establishes a Bluetooth connection to another device, the Bluetooth module 116 may receive, by using a data channel, a control instruction or a message sent by the another device, and send the control instruction or the message to the processor 180 for processing; or may send a control instruction or a message to the another device. In addition, by using an audio channel, the mobile phone 100 may receive or send audio, for example, make a voice call, or listen to music.

The memory 120 may be configured to store a software program and module. The processor 180 runs the software program and module stored in the memory 120, to implement various functional applications and data processing of the mobile phone 100. The memory 120 may include a program storage area and a data storage area. The program storage area may store an operating system, an application program required by at least one function (such as a sound playing function and an image playing function), and the like. The data storage area may store data (such as audio data, video data, and an address book) created according to use of the mobile phone 100, and the like. In addition, the memory 120 may include a volatile memory, such as a nonvolatile random access memory (Nonvolatile Random Access Memory, NVRAM), a phase change random access memory (Phase Change RAM, PRAM), or a magnetoresistive random access memory (Magnetoresistive RAM, MRAM), or may include a nonvolatile memory, such as at least one magnetic disk storage device, an electrically erasable programmable read-only memory (Electrically Erasable Programmable Read-Only Memory, EEPROM), a flash memory device such as an NOR flash memory (NOR flash memory) or an NAND flash memory (NAND flash memory), or a semiconductor device such as a solid state disk (Solid State Disk, SSD).

The input device 130 may be configured to: receive input digit or character information, and generate a key signal input related to a user setting and function control of the mobile phone 100. Specifically, the input device 130 may include a touch panel 131 and another input device 132. The touch panel 131, also referred to as a touchscreen, may collect a touch operation of a user on or near the touch panel 131 (such as an operation of the user on the touch panel 131 or near the touch panel 131 by using any suitable object or accessory such as a finger or a stylus), and drive a corresponding connection apparatus based on a preset program. Optionally, the touch panel 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent from the processor 180. In addition, the touch panel 131 may be implemented into touch panels of a plurality of types such as resistive, capacitive, infrared, and surface acoustic wave. Specifically, the input device 130 may further include the another input device 132 in addition to the touch panel 131. Specifically, the another input device 132 may include, but is not limited to, one or more of a physical keyboard, a functional key (such as a volume control key or a switch key), a trackball, a mouse, and a joystick.

The display screen 140 may be configured to display information that is input by the user or information provided to the user, and various interfaces of the mobile phone 100. The display screen 140 may include a display panel 141. Optionally, the display panel 141 may be configured by using a liquid crystal display (Liquid Crystal Display, LCD), an organic light-emitting diode (Organic Light-Emitting Diode, OLED), or the like. Further, the touch panel 131 may cover the display panel 141. After detecting a touch operation on or near the touch panel 131, the touch panel 131 transfers the touch operation to the processor 180, to determine a type of a touch event. Then, the processor 180 provides a corresponding visual output on the display panel 141 based on the type of the touch event. Although, in FIG. 1, the touch panel 131 and the display panel 141 are used as two separate parts to implement input and output functions of the mobile phone 100, in some embodiments, the touch panel 131 and the display panel 141 may be integrated to implement the input and output functions of the mobile phone 100. The display screen 140 may be configured to display content. The content includes a user interface, such as a startup interface of the mobile phone or a user interface of the application program. The content may further include information and data in addition to the user interface. The display screen 140 may be a built-in screen or another external display device of the mobile phone.

The sensor 150 includes at least one of an optical sensor, a motion sensor, a location sensor, or other sensors. Specifically, the optical sensor may include an ambient light sensor and a proximity sensor. The ambient light sensor may obtain brightness of ambient light, and the proximity sensor may switch off the display panel 141 and/or backlight when the mobile phone 100 is moved to an ear. The motion sensor may include an acceleration sensor. The acceleration sensor may detect magnitude of accelerations in various directions (generally on three axes), may detect magnitude and a direction of the gravity when the mobile phone when static, and may be applied to an application that recognizes an attitude of the mobile phone (for example, switching between landscape orientation and portrait orientation, a related game, and magnetometer posture calibration), a function related to vibration recognition (such as a pedometer and a knock), and the like. The location sensor may include the Global Positioning System (Global Positioning System, GPS), the BeiDou system (COMPASS), the GLONASS system (GLONASS), and the Galileo system (GALILEO), and is configured to obtain geographical location coordinates of the mobile phone. The location sensor may further perform positioning by using a base station on a mobile operator network and a local area network such as Wi-Fi or Bluetooth, or comprehensively use the foregoing positioning manners, to obtain more accurate mobile phone location information. Another sensor, such as a gyroscope, a barometer, a hygrometer, a thermometer, or an infrared sensor may be configured in the mobile phone 100, which is not described herein again.

The audio circuit 160, a speaker 161, and a microphone 162 (also referred to as a microphone) can provide an audio interface between the user and the mobile phone 100. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal and converts the electrical signal into audio data, and outputs the audio data to the processor 180 for processing. Then, the processor 680 sends the audio data to, for example, another mobile phone by using the RF circuit 110, or outputs the audio data to the memory 120 for further processing.

The I/O subsystem 170 may be configured to input or output various information or data of a system. The I/O subsystem 170 includes an input device controller 171, a sensor controller 172, and a display controller 173. The I/O subsystem 170 receives, by using the controllers, various data sent by the input unit 130, the sensor 150, and the display screen 140, and controls the foregoing components by sending a control instruction.

The processor 180 is a control center of the mobile phone 100, and is connected to various parts of the mobile phone by using various interfaces and lines. By running or executing the software program and/or the module stored in the memory 120, and invoking data stored in the memory 120, the processor 180 performs various functions and data processing of the mobile phone 1000, thereby performing overall monitoring on the mobile phone. The processor 180 may be a central processing unit (Central Processing Unit, CPU), a general-purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a transistor logic device, a hardware component, or any combination thereof. The processor 180 may implement or perform various examples of logic blocks, modules, and circuits described with reference to the content disclosed in this application. The processor 180 may also be a combination that implements a computation function, for example, including one microprocessor or a combination of a plurality of microprocessors, or a combination of a DSP and a microprocessor. Optionally, the processor 180 may include one or more processor units. Optionally, the processor 180 may further integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The application program includes any application installed on the mobile phone 100, including but not limited to a browser, an email, an instant messaging service, text processing, keyboard virtualization, a window widget (Widget), encryption, digital copyright management, speech recognition, voice replication, positioning (for example, a function provided by a global positioning system), music playing, and the like.

The mobile phone 100 further includes the power supply 190 (such as a battery) for supplying power to the components. Optionally, the power supply may be logically connected to the processor 180 by using a power management system, thereby implementing functions such as charging and discharging management and power consumption management by using the power management system.

It should be noted that, although it is not shown in the figure, the mobile phone 100 may further include a short-range wireless transmission device such as a Wi-Fi module, to implement short-range wireless communication of the mobile phone 100. Details are not described herein.

Figure 2A:
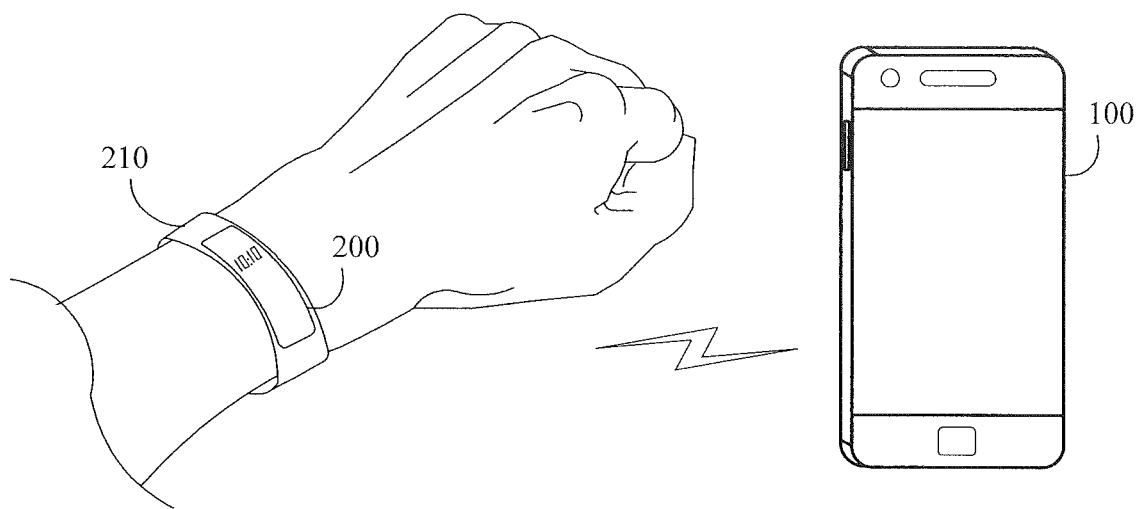
FIG. 2(A) and FIG. 2(B) are schematic diagrams of an application scenario according to an embodiment of the present invention.
Figure 2B:
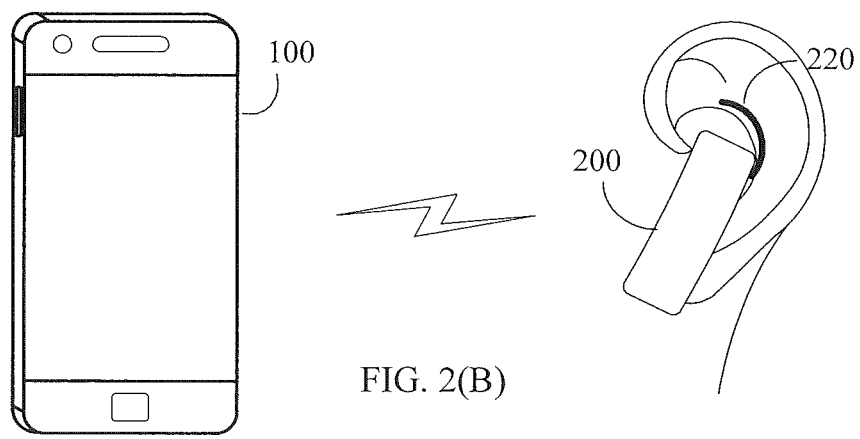

FIG. 2(A) and FIG. 2(B) are schematic diagrams of an application scenario according to an embodiment of the present invention. In FIG. 2(A), a wearable device 200 may be worn on a wrist of a user by using a wrist wearing member 210, and perform wireless communication with the mobile phone 100. In FIG. 2(B), the wearable device 200 is taken out of the wrist wearing member 210, is worn on an ear of the user by using an ear wearing member 220, and performs wireless communication with the mobile phone 100. The wrist wearing member 210 may be a structure that helps the user wear or support the wearable device 200 on the wrist, for example, a tie, a strap, or a wrist guard. A sensor may alternatively be disposed on the wrist wearing member 210 to cooperate with the wearable device 200 to detect a wearing status of the wearable device. The wrist wearing member 210 may further include a power supply, and may supply power to the wearable device 200 when being electrically connected to the wearable device 200. The ear wearing member 220 may be a structure that helps the user wear or support the wearable device 200 on the ear, for example, a rope lanyard or a hook.

To better adapt to requirements of different body parts, the wearable device 200 may enable or disable all or some functions of the wearable device based on characteristics of different wearing parts, and set statuses of the functions to different working modes, for example, an earphone mode corresponding to an ear wearing state, and a wristband mode corresponding to a wrist wearing state. It should be understood that, in addition to the wrist of the user, a wearing part of the wearable device 200 may be another body part such as an arm, a neck, a leg, or a torso of the user, and this is not limited in this application.

When being worn on the wrist of the user, the wearable device 200 may enter the wristband mode. In the wristband mode, the wearable device 200 can obtain motion data of the user by using a motion or location sensor, for example, step counting, a walking distance, or a geographical location; and can obtain vital sign data such as a heart rate, wrist muscle distribution, or energy consumption of the wrist of the user by using a vital sign sensor. A screen of the wearable device 200 may display the foregoing various data, or may display other information, for example, content such as time, date, incoming call information, a text message, e-mails, news, and weather information. In addition, the wearable device 200 can further make a voice call (for example, by using a hands-free function), or the like, by using an external speaker and a microphone.

When being worn on the ear of the user, the wearable device 200 may enter the earphone mode. In the earphone mode, the wearable device 200 may enable a built-in speaker, music or a voice message is played by using the built-in speaker, a voice call is made by using the built-in speaker and the microphone, and screen display is turned off. Optionally, the wearable device 200 may pause obtaining of data such as the motion data or the vital sign data.

Embodiment 1

Figure 3:
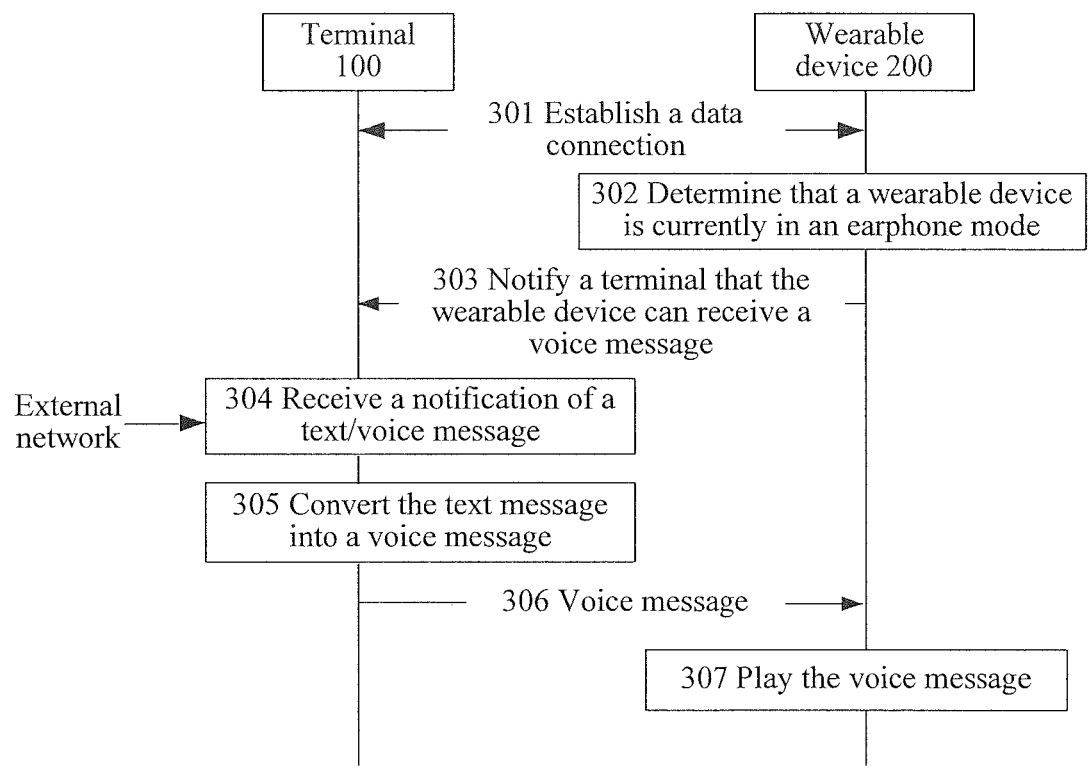
FIG. 3 is a schematic communication diagram of a first message obtaining method according to an embodiment of the present invention.

The following describes a first message obtaining method according to an embodiment of the present invention with reference to FIG. 3 and FIG. 4(A) to FIG. 4(E). FIG. 3 is a schematic communication diagram of the first message obtaining method. The method includes the following steps:

Step 301: A wearable device establishes a data connection to a terminal.

Step 302: The wearable device determines whether the wearable device is in an earphone mode.

Step 303: When the wearable device is in the earphone mode, the wearable device notifies the terminal that the wearable device can receive a voice message.

Step 304: The terminal receives a text message or a voice message sent from an external network.

Step 305: The terminal converts the text message into a voice message.

Step 306: The terminal sends the voice message to the wearable device.

Step 307: The wearable device plays the voice message.

In step 301, the data connection may be established by using various wireless communications technologies, for example, a wireless communications network that is established by using a wireless communications technology such as infrared, Bluetooth, Zigbee, or Wi-Fi. Optionally, the data connection may be a Bluetooth data connection. The wearable device may establish a data channel, an audio channel or a data channel and an audio channel to the terminal based on the Bluetooth data connection. The data channel may be used for transmitting various data between the wearable device and the terminal, and the various data includes a control instruction, an application program message notification, and other data. By using the control instruction, the wearable device can control the terminal to perform a corresponding operation, for example, answer a call, or start/pause/stop music playing. The terminal may alternatively control the wearable device to perform a corresponding operation, for example, enable or disable a sensor of the wearable device. The audio channel is used for transmitting audio data between the wearable device and the terminal. Content about the audio channel is described below in detail. It should be understood that, the audio channel may share a data transmission channel with the data channel.

In step 302, by detecting a wearing status, the wearable device determines whether the wearable device is in the earphone mode. Specifically, when an ear wearing state is detected or a wrist wearing state is not detected, it is determined that the wearable device is in the earphone mode; when the ear wearing state is not detected or the wrist wearing state is not detected, it is determined that the wearable device is not in the earphone mode (also referred to as a wristband mode). Detecting the wearing status by the wearable device may be independently completed by the wearable device, or may be completed in cooperation with a wrist wearing member.

Figure 4A:
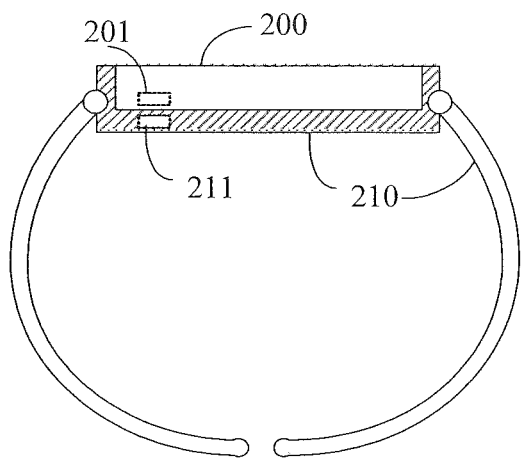
FIG. 4(A) to FIG. 4(E) are schematic diagrams of an implementation solution in which a wearable device detects a wearing status according to an embodiment of the present invention.

In an example, the wearable device may detect the wearing status by using a Hall effect sensor. In an example, as shown in FIG. 4(A), a Hall effect sensor 201 may be disposed inside a wearable device 200, a magnet 211 may be disposed at a location that is on the wrist wearing member 210 and that is corresponding to the Hall effect sensor 201. When the wearable device 200 is disposed inside the wrist wearing member 210, the Hall effect sensor 201 is close to the magnet 211, and is in a preset disabled state. In this case, the wearable device 200 may be considered to be in the wrist wearing state. When the wearable device 200 is taken out of the wrist wearing member 210, the Hall effect sensor 201 is far away from the magnet 211 and therefore senses a change of a magnetic field, and the preset disabled state is changed to an enabled state. In this case, the wearable device 200 may be considered to be not in the wrist wearing state, or the wearable device 200 may be considered to be in the ear wearing state. Therefore, the wearable device may determine, based on the enabled state and the disabled state of the Hall effect sensor 201, whether the wearable device 200 is in the earphone mode. When the Hall effect sensor 201 is enabled, it is determined that the wearable device 200 is in the earphone mode. When the Hall effect sensor 201 is disabled, it is determined that the wearable device 200 is in the wristband mode. It should be understood that, a preset status of the Hall effect sensor 201 may alternatively be the enabled state, so that when the Hall effect sensor 201 is disabled, it is determined that the wearable device 200 is in the earphone mode. When the Hall effect sensor 201 is enabled, it is determined that the wearable device 200 is in the wristband mode. Existing products may be used as the Hall effect sensor 201 and the magnet 211, and locations of the Hall effect sensor 201 and the magnet 211 may be selected depending on an actual requirement. Details are not described herein.

Figure 4B:
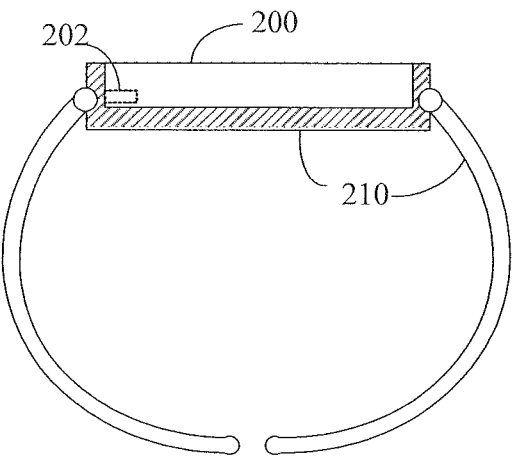

In another example, the wearable device may detect the wearing status by using a mechanical contact switch. In an example, as shown in FIG. 4(B), the mechanical contact switch 202 may be disposed at a location that is on the wearable device 200 and that is in contact with the wrist wearing member 201. When the wearable device 200 is disposed inside a wrist wearing structure 210, the mechanical contact switch 202 is pressed by the wrist wearing structure 210 and is in a preset closed state. When the wearable device 200 is taken out of the wrist wearing structure 210, the mechanical contact switch 202 is released from a pressed state and the preset closed state is switched to an open state. Therefore, it may be determined, based on the open state and the closed state of the mechanical contact switch 202, whether the wearable device 200 is in the earphone mode. When the mechanical contact switch 202 is open, it is determined that the wearable device 200 is in the earphone mode. When the mechanical contact switch 202 is closed, it is determined that the wearable device 200 is in the wristband mode. It should be understood that, a preset status of the mechanical contact switch 202 may be the open state, so that when the mechanical contact switch 202 is closed, the wearable device 200 is in the earphone mode, and when the mechanical contact switch 202 is open, the wearable device 200 is in the wristband mode. An existing product may be used as the mechanical contact switch 202, and a location of the mechanical contact switch 202 may be selected depending on an actual requirement. Details are not described herein.

Figure 4C:
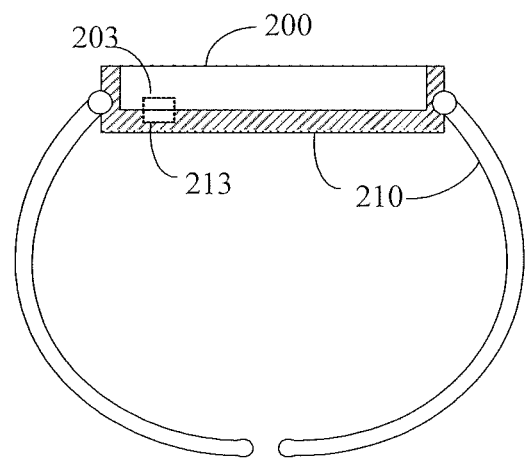

In another example, the wearable device may detect the wearing status by using an electronic contact switch. In an example, as shown in FIG. 4(C), an electronic contact switch 203 may be disposed at a location that is on the wearable device 200 and that is in contact with the wrist wearing member 201, and an electronic contact 213 may be disposed at a corresponding location on the wrist wearing structure 201. When the wearable device 200 is disposed inside the wrist wearing structure 201, the electronic contact switch 203 is switched on by using the electronic contact 213. When the wearable device is taken out of the wrist wearing structure, the electronic contact switch 203 is switched off. Therefore, it may be determined, based on a status of the electronic contact switch 203, whether the wearable device 200 is in the earphone mode. When the electronic contact switch 203 is switched off, it is determined that the wearable device 200 is in the earphone mode. When the electronic contact switch 203 is switched on, it is determined that the wearable device 200 is in the wristband mode. It should be understood that, locations of the electronic contact switch 203 and the electronic contact 213 are interchangeable. The electronic contact switch 203 may be disposed on the wrist wearing structure 210, and the electronic contact 213 may be disposed on the wearable device 200. An existing product may be used as the electronic contact switch 203, and the location of the electronic contact switch 203 may be selected depending on an actual requirement. Details are not described herein.

In another example, the wearable device may detect the wearing status by using a vital sign sensor. The vital sign sensor may include a transmissive photoelectric sensor or an electrical impedance sensor.

Figure 4D:
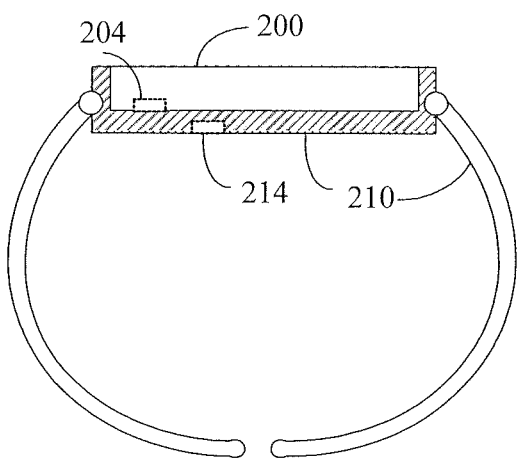

In an example, as shown in FIG. 4(D), transmissive photoelectric sensors 204 and 214 may be respectively disposed on the wearable device 200 and the wrist wearing structure 210. The wearable device 200 and the wrist wearing structure 210 may be connected by using an electrical connection structure, for example, connected by using an electronic contact. By measuring light reflected by or transmitted through skin, the transmissive photoelectric sensors 204 and 214 may determine whether light transmission sensors are in contact with the skin. When the wearable device 200 is worn on a wrist of a user, the transmissive photoelectric sensor 214 on the wrist wearing structure 210 detects contact with skin, and therefore determines that the wearable device 200 is in the wristband mode. When the wearable device 200 is worn on an ear of the user, the transmissive photoelectric sensor 204 on the wearable device 200 detects contact with skin, and therefore determines that the wearable device 200 is in the earphone mode. It should be understood that existing products may be used as the transmissive photoelectric sensors 204 and 214, and locations of the transmissive photoelectric sensors 204 and 214 may be selected depending on an actual requirement. Details are not described herein.

Optionally, the transmissive photoelectric sensor 204 may be only disposed on the wearable device 200. When the wearable device 200 is worn on the ear of the user, the transmissive photoelectric sensor 204 on the wearable device 200 detects the contact with the skin, and therefore determines that the wearable device 200 is in the earphone mode. Otherwise, the transmissive photoelectric sensor 204 on the wearable device 200 determines that the wearable device 200 is in the wristband mode.

Figure 4E:
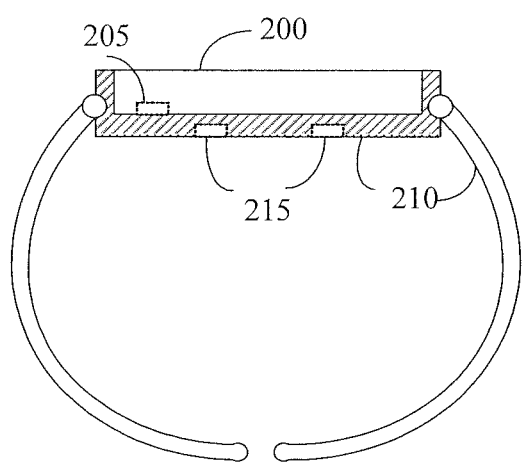

In another example, as shown in FIG. 4(E), electrical impedance sensors 205 and 215 may be respectively disposed on the wearable device 200 and the wrist wearing structure 210. The wearable device 200 and the wrist wearing structure 210 may be connected by using an electrical connection structure, for example, connected by using an electronic contact. The electrical impedance sensors 205 and 215 may detect contact with skin by measuring electrical impedance on a skin surface, and may further detect a distribution status of biological tissues, for example, muscle tissue distribution and fat tissue distribution, on the skin surface by obtaining electrical impedance distribution. Among these biological tissues, higher-density tissues such as muscle tissues have higher electrical impedance and lower-density tissues such as fat tissues have lower electrical impedance. When the wearable device 200 is worn on a wrist of a user, the electrical impedance sensor 215 on the wrist wearing structure 210 detects contact with skin, and therefore determines that the wearable device 200 is in the wristband mode. When the wearable device 200 is worn on an ear of the user, the electrical impedance sensor 205 on the wearable device 200 detects contact with skin, and therefore determines that the wearable device is in the earphone mode. It should be understood that, existing products may be used as the electrical impedance sensors 205 and 215, and locations of the electrical impedance sensors 205 and 215 may be selected depending on an actual requirement. Details are not described herein.

Optionally, the electrical impedance sensor 205 may be only disposed on the wearable device 200. When the wearable device 200 is worn on the ear of the user, the electrical impedance sensor 205 on the wearable device 200 detects the contact with the skin, and therefore determines that the wearable device is in the earphone mode. Otherwise, the electrical impedance sensor 205 on the wearable device 200 determines that the wearable device is in the wristband mode.

In addition, the wearing status of the wearable device may be detected by using another existing method. Details are not described herein.

In step 303, that the wearable device notifies the terminal that the wearable device can receive a voice message includes: establishing, by the wearable device, an audio channel to the terminal, and sending, to the terminal, a message indicating that the wearable device is currently in the earphone mode.

The audio channel may be used for transmitting audio data between the wearable device and the terminal. The audio channel may be established by using various wireless communications technologies, for example, an infrared audio channel, an analog audio channel, Bluetooth, Zigbee, and Wi-Fi. Optionally, the audio channel may be a Bluetooth transmission-based audio channel. The wearable device and the terminal can be paired and connected by using a Bluetooth module, so that a Bluetooth connection-based audio channel can be established between the wearable device and the terminal. Optionally, the audio channel may be an Advanced Audio Distribution Profile (Advanced Audio Distribution Profile, A2DP)-based audio channel, or may be a Hands-free Profile (Hands-free Profile, HFP)-based audio channel. Specifically, when the audio channel is an A2DP audio channel, the audio channel may be used for transmitting high-quality stereo audio data.

When the audio channel is established between the wearable device and the terminal, the wearable device may enable the audio channel, and send a request for establishing an audio channel to the terminal. The request may be sent by using the data connection established in step 301.

After receiving the request for establishing the audio channel, if agreeing to establish the audio channel, the terminal enables the audio channel, and sends an agreement response for establishment of the audio channel to the wearable device, thereby completing the establishment of the audio channel; otherwise, the terminal does not enable the audio channel, and sends a rejection response to the wearable device, and in this case, the wearable device may disable the audio channel.

Optionally, the wearable device may enable the audio channel when establishing the data connection, and the wearable device may send the request for establishing the audio channel to the terminal when the wearable device establishes the audio channel to the terminal. The terminal may also enable the audio channel when establishing the data connection. If agreeing to establish the audio channel to the wearable device, the terminal sends an agreement response to the wearable device. In this way, frequent enabling or disabling of the audio channel may be avoided.

It should be noted that, for the wearable device, there is no fixed order between enabling of the audio channel and sending of the request for establishing the audio channel. The wearable device may send the request for establishing the audio channel to the terminal while enabling the audio channel; or may enable the audio channel before sending the request for establishing the audio channel to the terminal; or may send the request for establishing the audio channel to the terminal and then enable the audio channel when receiving an agreement response from the terminal.

The wearable device may send, to the terminal by using the data connection, a message indicating that the wearable device is in the earphone mode. The message indicating that the wearable device is in the earphone mode may be sent when the wearable device detects the earphone mode. The wearable device may alternatively detect the wearing status based on a preset period and report a detection result to the terminal. The preset period may be set depending on an actual requirement, for example, 1 s, 2 s, 5 s, or 10 s.

In step 304, the terminal receives the text message sent from the external network. The terminal receives the text message from the external network, and the external network may be any of the various wireless networks mentioned in the foregoing. The text message may be any of the various types of text messages or notifications, for example, a Short Messaging Service message, a message of an instant messaging application program, and another application program notification.

In step 305, the terminal may convert the text message by using a TTS (Text To Speech, text to speech) function. The TTS function may convert a text into a natural and smooth speech based on a speech synthesis technology. An existing method may be used to convert the text message into the voice message by using the TTS function. Details are not described herein.

In step 306, the wearable device receives the voice message sent by the terminal. The voice message may be sent by using the audio channel. Optionally, the voice message may be sent by using the A2DP audio channel, to obtain a high-quality voice message.

In step 307, after receiving the voice message, the wearable device can play the voice message by using a built-in speaker. Optionally, the wearable device may notify, in a voice manner, the user that the voice message is received, and prompt the user to choose to or not to play the voice message.

In this embodiment of the present invention, the data channel and the audio channel may be established between the wearable device and the terminal. When being in the earphone mode, the wearable device notifies the terminal of a current status, and receives and plays the voice message that is obtained by converting the text message and that is sent by the terminal, so that an insufficient screen display capability of the wearable device can be overcome, and the user can conveniently check content of the text message in time.

Embodiment 2

Figure 5:
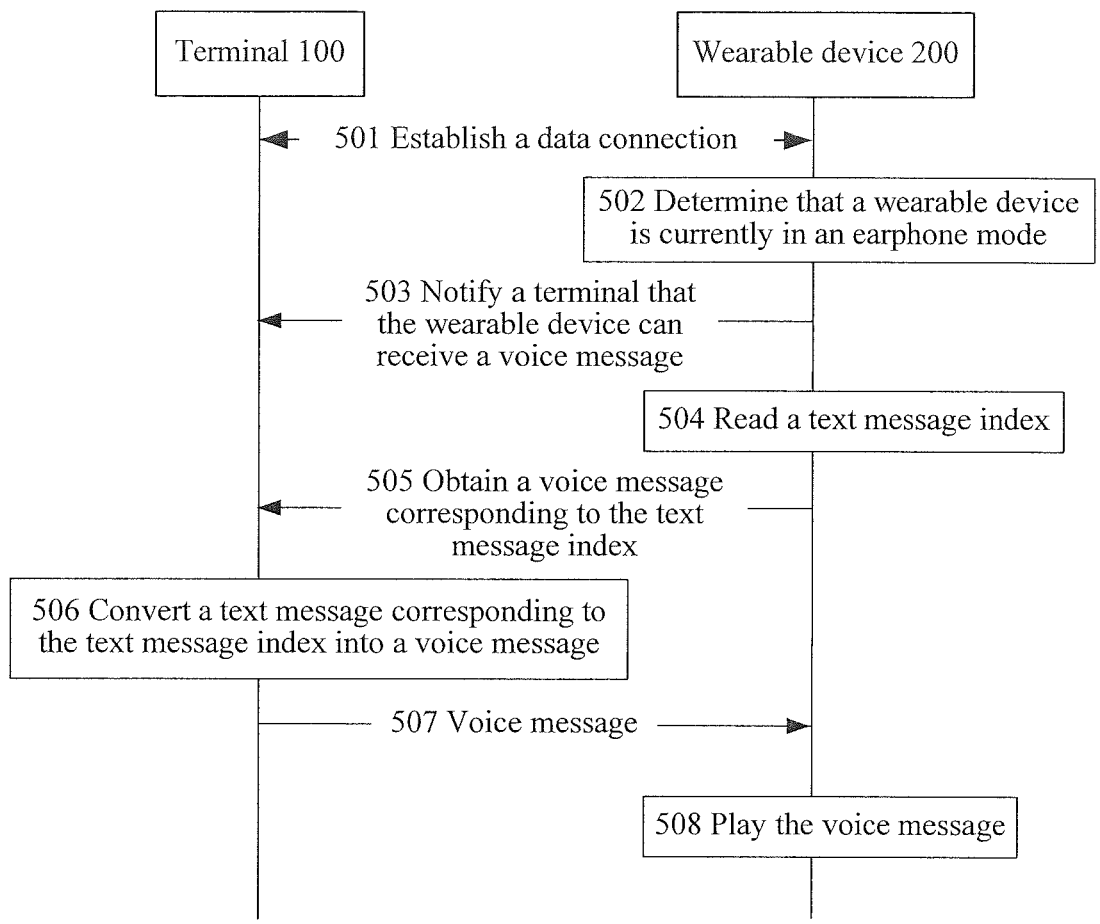
FIG. 5 is a schematic communication diagram of a second message obtaining method according to an embodiment of the present invention.

The following specifically describes a second message obtaining method according to an embodiment of the present invention with reference to FIG. 5. FIG. 5 is a flowchart of the second message obtaining method. The method includes the following steps:

Step 501: A wearable device establishes a data connection to a terminal.

Step 502: The wearable device determines whether the wearable device is in an earphone mode.

Step 503: When the wearable device is in the earphone mode, the wearable device notifies the terminal that the wearable device can receive a voice message.

Step 504: The wearable device reads a text message index.

Step 505: The wearable device sends, to the terminal, a notification about obtaining a voice message corresponding to the text message index.

Step 506: The terminal converts a corresponding text message into a voice message based on the text message index.

Step 507: The terminal sends the voice message to the wearable device.

Step 508: The wearable device plays the voice message.

Steps 501 to 503 are respectively similar to steps 301 to 303. Steps 507 and 508 are respectively similar to steps 306 and 307. Details are not described herein again.

In step 504, the text message index is created by the terminal based on the text message. The text message index includes a unique identifier (Unique Identifier, UID) of each text message. After receiving the text message from the external network, the terminal creates the text message index based on a preset rule, locally stores the text message in the terminal, and sends the text message index to the wearable device. The preset rule may be a receiving time of the text message, a creation time of the text message, or a type of or use frequency of an application program. For example, a Short Messaging Service message and a message of an instant messaging application program have higher priorities. Alternatively, a message of a frequently used application program has a higher priority. In addition, the terminal may create text message indices for all received text messages, or for only a Short Messaging Service message, a message of an instant messaging application program, and the like.

The wearable device locally stores the received text message index. Optionally, the wearable device may store the received text message index in a local voice mailbox. The voice mailbox may be a storage area that is set by the wearable device to read a voice message or a text message index. After notifying the terminal that the wearable device can receive a voice message, the wearable device reads an entry whose text message index ranks top. Optionally, the wearable device may read, based on a user operation, for example, an operation of touching or pressing a control button of the wearable device by a user each time, or based on a voice instruction of a user, an entry whose text message index ranks top.

In step 506, after receiving the notification that is sent by the wearable device and that is about obtaining the voice message corresponding to the text message index, the terminal searches, based on the text message index, for the text message locally stored in the terminal, and converts the text message into the voice message. For details about the conversion of the text message into the voice message, refer to the description of step 305 in the foregoing, and details are not described herein again.

In this embodiment of the present invention, a data channel and an audio channel may be established between the wearable device and the terminal. The terminal may create the text message index based on the text message when the wearable device is in a wristband mode or a wearing mode of the wearable device cannot be determined, locally store the text message, and send the text message index to the wearable device. When being in the earphone mode, the wearable device notifies the terminal of a current status, and receives and plays the voice message that is obtained by converting the text message and that is sent by the terminal, thereby overcoming an insufficient screen display capability of the wearable device, and enabling the user to conveniently check content of the text message in time.

Embodiment 3

Figure 6:
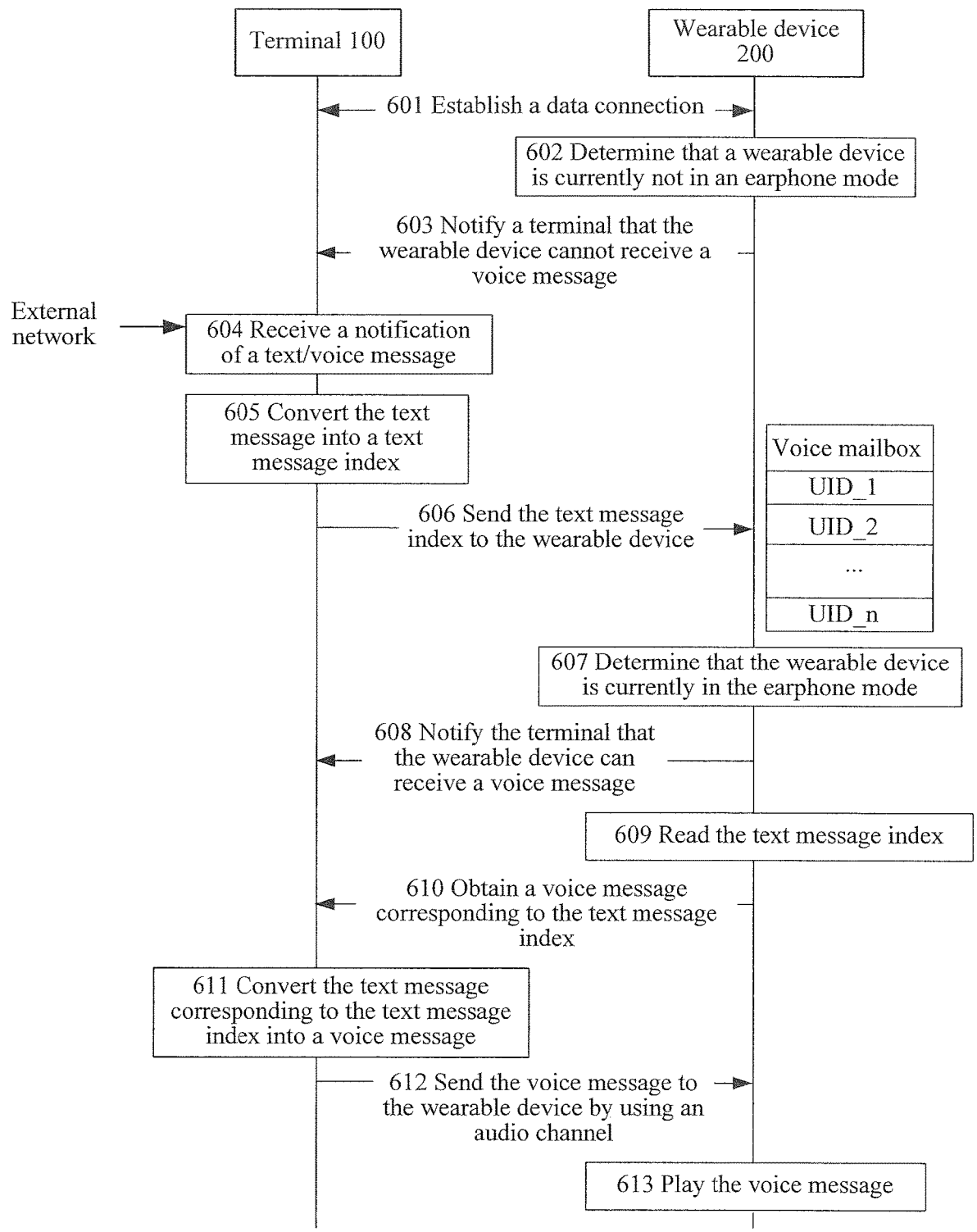
FIG. 6 is a schematic communication diagram of a third message obtaining method according to an embodiment of the present invention.

The following describes a third message obtaining method according to an embodiment of the present invention with reference to FIG. 6. FIG. 6 is a schematic communication diagram of the third message obtaining method. The method includes the following steps:

Step 601: A wearable device establishes a data connection to a terminal.

Step 602: The wearable device determines whether the wearable device is not in an earphone mode.

Step 603: When determining that the wearable device is not in an earphone mode, the wearable device notifies the terminal that the wearable device cannot receive a voice message.

Step 604: The terminal receives a text message or a voice message sent from an external network.

Step 605: The terminal creates a text message index for the text message.

Step 606: The terminal sends the text message index to the wearable device.

Step 607: The wearable device determines that the wearable device is currently in the earphone mode.

Step 608: When determining that the wearable device is in the earphone mode, the wearable device notifies the terminal that the wearable device can receive a voice message.

Step 609: The wearable device reads the text message index.

Step 610: The wearable device sends, to the terminal, a notification about obtaining a voice message corresponding to the text message index.

Step 611: The terminal converts the corresponding text message into a voice message based on the text message index.

Step 612: The terminal sends the voice message to the wearable device by using an audio channel.

Step 613: The wearable device plays the voice message.

In this embodiment of the present invention, steps 601, 602, and 604 are respectively similar to steps 301, 302, and 304 in the foregoing, and steps 607 to 613 are respectively similar to steps 502 to 508 in the foregoing. Details are not described herein again.

In step 603, the wearable device may send, by using the data connection established in step 601, the notification indicating that the wearable device cannot receive a voice message.

In step 605, after receiving the text message from the external network, the terminal creates the text message index based on a preset rule, locally stores the text message, and sends the text message index to the wearable device. The preset rule may be a receiving time of the text message; or may be a creation time of the text message; or may be a type of or use frequency of an application program. For example, a Short Messaging Service message and a message of an instant messaging application program have high priorities. Alternatively, a message of an application program with high use frequency has a higher priority. In addition, the terminal may create text message indices for all received text messages, or may create text message indices only for a Short Messaging Service message, a message of an instant messaging application program, and the like.

Optionally, after receiving each text message, the terminal may immediately create a corresponding text message index.

Optionally, the terminal may store the received text message, and create the corresponding text message index once every preset period. The preset period may be 5 minutes, 15 minutes, 30 minutes, 60 minutes, or the like, and the preset period may be set depending on an actual requirement. This is not limited in this application.

Optionally, the terminal immediately creates a corresponding text message index for a Short Messaging Service message, a message of an instant messaging application program, or the like that is received; or creates a text message index once every preset period for a message of another type of application program.

When the terminal sends the text message index to the wearable device in step 606, the terminal may immediately send the text message index to the wearable device after creating the text message index; or may send the text message index to the wearable device based on the preset period. The preset period may be set depending on an actual requirement. This is not limited in this application.

A control instruction, a message notification, and the text message index in the foregoing steps may be sent by using the data connection established between the terminal and the wearable device. Details are not described herein.

In this embodiment of the present invention, a data channel and the audio channel are established between the wearable device and the terminal by using a Bluetooth module. The terminal may create the text message index based on the text message when the wearable device is in the wristband mode, locally store the text message, and send the text message index to the wearable device. When being in the earphone mode, the wearable device notifies the terminal of a current status, and receives and plays the voice message that is obtained by converting the text message and that is sent by the terminal, thereby overcoming an insufficient screen display capability of the wearable device, and enabling a user to conveniently check content of the text message in time.

Embodiment 4

Figure 7:
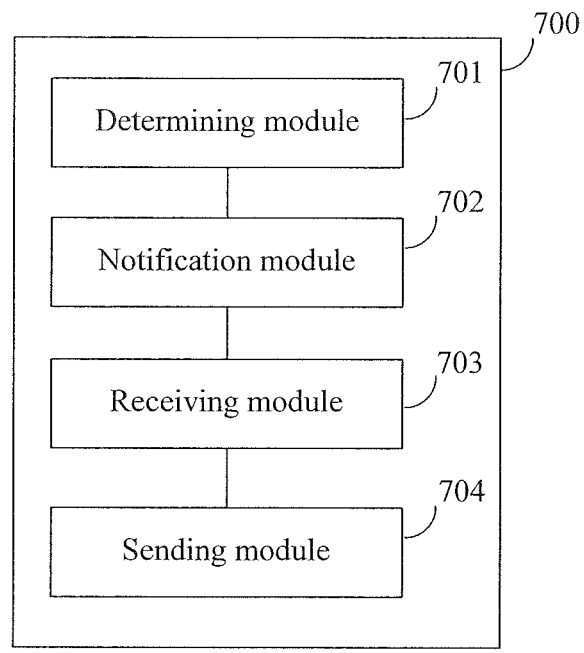
FIG. 7 is a schematic structural diagram of a first wearable device according to an embodiment of the present invention.

FIG. 7 is a schematic structural diagram of a wearable device according to an embodiment of the present invention.

The wearable device according to this embodiment of the present invention may be used for implementing the methods implemented in the embodiments of the present invention shown in FIG. 3 to FIG. 6. As shown in FIG. 7, the wearable device 700 includes:

a determining module 701, a notification module 702, and a receiving module 703.

The determining module 701 is configured to determine whether the wearable device is in an earphone mode.

The notification module 702 is configured to: when the wearable device is in the earphone mode, notify, by the wearable device, a terminal that the wearable device can receive a voice message.

The receiving module 703 is configured to receive a voice message sent by the terminal, where the voice message is obtained by converting a text message by the terminal.

Further, the determining module 701 is configured to determine, by using a Hall effect sensor, whether the wearable device is in the earphone mode.

Further, the wearable device 700 further includes a sending module 704. The sending module 704 is configured to send a request for establishing an audio channel to the terminal. The receiving module 703 is further configured to receive a response that is of confirming establishment of the audio channel and that is sent by the terminal.

Optionally, the sending module 704 is further configured to send a request for establishing an audio channel and a text message index to the terminal.

Further, the receiving module 703 is further configured to receive a text message index sent by the terminal.

In this embodiment of the present invention, a data channel and the audio channel may be established between the wearable device and the terminal. When being in the earphone mode, the wearable device notifies the terminal of a current status, and receives and plays the voice message that is obtained by converting the text message and that is sent by the terminal. The terminal creates the text message index based on the text message when the wearable device is in a wristband mode, converts the text message into the voice message based on the text message index when the wearable device is in the earphone mode, and sends the voice message to the wearable device, thereby overcoming an insufficient screen display capability of the wearable device, and enabling a user to conveniently check content of the text message in time.

Embodiment 5

Figure 8:
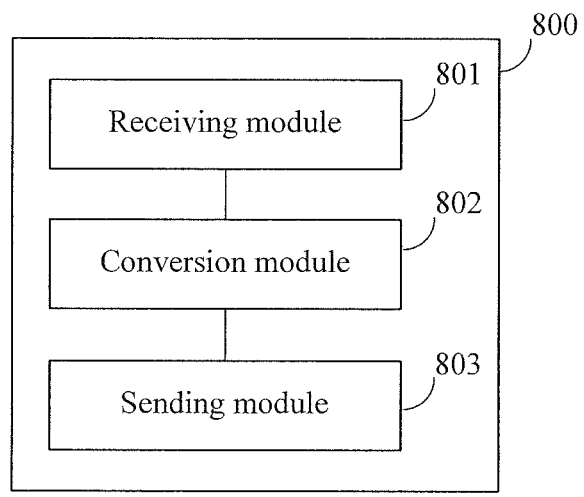
FIG. 8 is a schematic structural diagram of a second terminal according to an embodiment of the present invention.

FIG. 8 is a schematic structural diagram of a terminal according to an embodiment of the present invention. The terminal according to this embodiment of the present invention may be used for implementing the methods implemented in the embodiments of the present invention shown in FIG. 3 to FIG. 6. As shown in FIG. 8, the terminal 800 includes:

a receiving module 801, a conversion module 802, and a sending module 803.

The receiving module 801 is configured to receive a notification that is sent by a wearable device and that indicates that the wearable device can receive a voice message.

The conversion module 802 is configured to convert a text message into a voice message.

The sending module 803 is configured to send the voice message to the wearable device.

Further, the receiving module 801 is further configured to receive a request for establishing an audio channel sent by the wearable device. The sending module 803 is further configured to send a response of confirming establishment of the audio channel to the wearable device.

Optionally, the receiving module 801 is further configured to receive a request for establishing an audio channel and a text message index that are sent by the wearable device.

Further, the sending module 803 is further configured to send the text message index to the wearable device.

In this embodiment of the present invention, a data channel and the audio channel may be established between the terminal and the wearable device. When the wearable device is in an earphone mode, the wearable device notifies the terminal of a current status, and the terminal converts the text message into the voice message and sends the voice message to the wearable device. The terminal creates the text message index based on the text message when the wearable device is in a wristband mode, converts the text message into the voice message based on the text message index when the wearable device is in the earphone mode, and sends the voice message to the wearable device, thereby overcoming an insufficient screen display capability of the wearable device, and enabling a user to conveniently check content of the text message in time.

Embodiment 6

Figure 9:
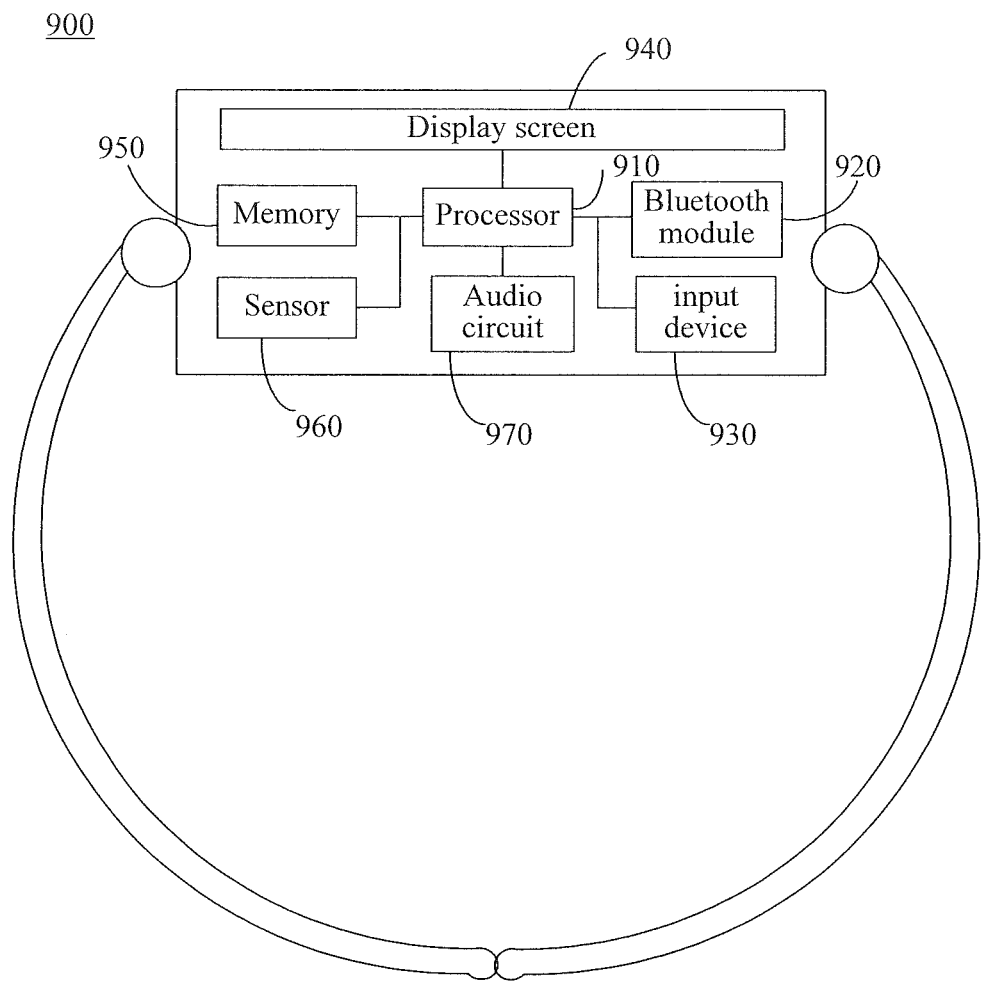
FIG. 9 is a schematic structural diagram of a second wearable device according to an embodiment of the present invention.

FIG. 9 is a schematic structural diagram of a wearable device according to an embodiment of the present invention. The wearable device according to this embodiment of the present invention may be used for implementing the methods implemented in the embodiments of the present invention shown in FIG. 3 to FIG. 6. As shown in FIG. 9, the wearable device 900 includes: a processor 910, a Bluetooth module 920, an input device 930, a display screen 940, a memory 950, a sensor 960, and an audio circuit 970. For the convenience of description, only parts related to this embodiment of the present invention are shown. For specific technical details that are not disclosed, refer to the embodiments of the present invention and other parts of the application document.

The processor 910 may be the processor 180 shown in FIG. 1. The processor 910 is connected to the Bluetooth module 920, the input device 930, the display screen 940, the memory 950, the sensor 960, and the audio circuit 970 by using one or more buses, to process various data.

The Bluetooth module 920 may be the Bluetooth module 116 shown in FIG. 1, and is configured to: establish a data connection to the terminal, receive and send a message notification, a control instruction, and audio data (including a voice message), and send them to the processor 910 for processing or store them in the memory 950.

The input device 930 may be the input device 130 shown in FIG. 1, and the input device 930 may further include a touch key or a physical key, to receive a control instruction. The control instruction is triggered by a touch operation obtained by the touch key, or triggered by pressing the physical key. The control instruction may be an instruction for obtaining a text message corresponding to a text message index.

The display screen 940 may be the display screen 140 shown in FIG. 1. The display screen 940 may display various data obtained by the sensor 960, or may display other information, for example, content such as time, date, incoming call information, a text message, e-mails, news, and weather information.

The sensor 960 may be the sensor 150 shown in FIG. 1, and may be configured to obtain motion data of a user and vital sign data of a wearing part, so that a wearing status of the wearable device can be determined.

The audio circuit 970 may be the audio circuit 160 shown in FIG. 1, and may be configured to: decode a voice message, and play the voice message. The decoding of the voice message may be completed by using the processor 910, or may be completed by using an audio encoding and decoding chip provided in the audio circuit 970. The audio circuit 970 may further include a speaker and a microphone. The speaker may be configured to play a voice message and other audio information, and the microphone may be configured to accept an audio message or a voice instruction. Optionally, the speaker may further include a built-in speaker and an external speaker. The built-in speaker may be used in an earphone mode, and the external speaker may be used in a wristband mode.

In this embodiment of the present invention, a data channel and an audio channel may be established between the wearable device and the terminal. When being in the earphone mode, the wearable device notifies the terminal of a current status, and receives and plays the voice message that is obtained by converting the text message and that is sent by the terminal. The terminal creates the text message index based on the text message when the wearable device is in the wristband mode, converts the text message into the voice message based on the text message index when the wearable device is in the earphone mode, and sends the voice message to the wearable device, thereby overcoming an insufficient screen display capability of the wearable device, and enabling the user to conveniently check content of the text message in time.

Embodiment 7

Figure 10:
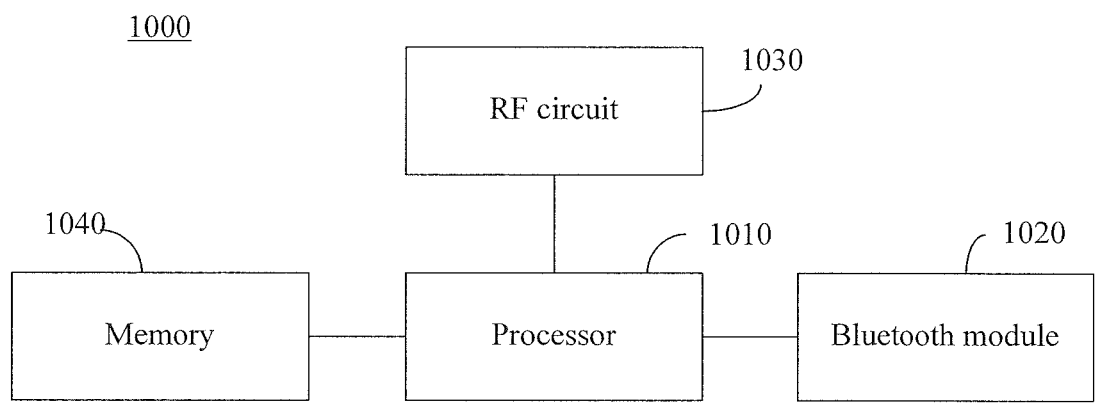
FIG. 10 is a schematic structural diagram of a third terminal according to an embodiment of the present invention.

FIG. 10 is a schematic structural diagram of a terminal according to an embodiment of the present invention. The terminal according to this embodiment of the present invention may be used for implementing the methods implemented in the embodiments of the present invention shown in FIG. 3 to FIG. 6. As shown in FIG. 10, the terminal 1000 includes: a processor 1010, a Bluetooth module 1020, an RF circuit 1030, and a memory 1040. For the convenience of description, only parts related to this embodiment of the present invention are shown. For specific technical details that are not disclosed, refer to the embodiments of the present invention and other parts of the application document.

The processor 1010 may be the processor 180 shown in FIG. 1. The processor 1010 is connected to the Bluetooth module 1020, the RF circuit 1030, and the memory 1040 by using one or more buses, to process various data.

The Bluetooth module 1020 may be the Bluetooth module 116 shown in FIG. 1, and is configured to: establish a data connection to a wearable device, receive and send a message notification, a control instruction, and audio data (including a voice message), and send them to the processor 1010 for processing or store them in the memory 1040.

The RF circuit 1030 may be the RF circuit 110 shown in FIG. 1, and is configured to receive a text message and a call from an external wireless network.

In this embodiment of the present invention, a data channel and an audio channel may be established between the terminal and the wearable device. When the wearable device is in an earphone mode, the wearable device notifies the terminal of a current status, and the terminal converts the text message into the voice message and sends the voice message to the wearable device. The terminal creates a text message index based on the text message when the wearable device is in a wristband mode, converts the text message into the voice message based on the text message index when the wearable device is in the earphone mode, and sends the voice message to the wearable device, thereby overcoming an insufficient screen display capability of the wearable device, and enabling a user to conveniently check content of the text message in time.

All or some of the foregoing embodiments of the present invention may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer readable storage medium or may be transmitted from a computer readable medium to another computer readable medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave, or the like) manner. The computer readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a Solid State Disk (SSD)), or the like.

A person skilled in the art should be aware that in the foregoing one or more examples, functions described in the present invention may be implemented by hardware, software, firmware, or any combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, the technical solutions, and the beneficial effects of the present invention are further described in detail in the foregoing specific implementations. It should be understood that, the foregoing describes only examples of the embodiments of the technical solutions of the present invention, and is not used for limiting the protection scope of the present invention. Any modification, equivalent replacement, or improvement made without departing from the spirit and principle of the present invention shall fall within the protection scope of the present invention.

What is claimed is:

1. A system, comprising:
  a wearable device; and
  a wrist wearing member;
  wherein
    the wearable device:

is worn on the wrist wearing member;
   determines that the wearable device is in an earphone mode when the wearable device is separated from the wrist wearing member and that the wearable device is in a wristband mode when the wearable device is not separated from the wrist wearing member;
   notifies a terminal that the wearable device is able to receive a voice message when the wearable device is in the earphone mode, and that the wearable device is not able to receive the voice message when the wearable device is in the wristband mode; and
   when the wearable device is in the earphone mode, receives the voice message sent by the terminal, wherein the voice message is obtained by converting a text message by the terminal.

2. The system according to claim 1, wherein the wearable device determines that the wearable device is in the earphone mode by using a Hall effect sensor.

3. The system according to claim 1, wherein the wearable device:
   sends a request for establishing an audio channel to the terminal, and
   receives a response sent by the terminal confirming establishment of the audio channel.

4. The system according to claim 1, wherein the wearable device:
   sends a request for establishing an audio channel to the terminal;
   receives a response sent by the terminal confirming establishment of the audio channel; and
   sends a text message index to the terminal.

5. The system according to claim 4, wherein the text message is a text message corresponding to the text message index.

6. The system according to claim 1, wherein the text message comprises a text message received or pre-stored by the terminal.

7. The system according to claim 1, wherein the wearable device receives a text message index sent by the terminal, wherein the text message index is created by the terminal based on the text message.

8. The system according to claim 1, wherein the audio channel comprises an Advanced Audio Distribution Profile A2DP audio channel.

9. The system according to claim 1, wherein the wearable device, when the wearable device is in the wristband mode, does not receive the voice message sent by the terminal.

10. A message obtaining method applied to a terminal, comprising:
   receiving, by the terminal, a first notification that is sent by a wearable device and that indicates that the wearable device is able to receive a voice message, and a second notification that is sent by the wearable device and that indicates that the wearable device is not able to receive the voice message;
   converting, by the terminal, a text message into the voice message; and
   sending, by the terminal, the voice message to the wearable device if the terminal receives the first notification.

11. The method according to claim 10, wherein the first notification indicating that the wearable device is able to receive the voice message is sent by the wearable device when the wearable device determines that the wearable device is in an earphone mode,
   wherein the second notification indicating that the wearable device is not able to receive the voice message is sent by the wearable device when the wearable device determines that the wearable device is in a wristband mode.

12. The method according to claim 10, further comprising:
   receiving, by the terminal, a request for establishing an audio channel sent by the wearable device; and
   sending, by the terminal, a response confirming establishment of the audio channel to the wearable device.

13. The method according to claim 12, further comprising:
   receiving, by the terminal, a request for establishing an audio channel sent by the wearable device;
   sending, by the terminal, a response confirming establishment of the audio channel to the wearable device; and
   receiving, by the terminal, a text message index sent by the wearable device.

14. The method according to claim 13, wherein
   the text message is a text message corresponding to the text message index.

15. The method according to claim 10, wherein
   the text message comprises a text message received or pre-stored by the terminal.

16. The method according to claim 10, further comprising:
   sending, by the terminal, a text message index to the wearable device, wherein the text message index is created by the terminal based on the text message.

17. The method according to claim 10, wherein the audio channel comprises an Advanced Audio Distribution Profile A2DP audio channel.

18. The method according to claim 10, further comprising:
   sending, by the terminal, no voice message to the wearable device if the terminal receives the second notification.

19. A wearable device, comprising:
   a processor, configured to determine that the wearable device is in an earphone mode when the wearable device is physically separated from a wearing member and that the wearable device is not in the earphone mode when the wearable device is not physically separated from the wearing member; and
   a Bluetooth module, configured to:
      when the wearable device is in the earphone mode, notify a terminal that the wearable device is able to receive a voice message, and when the wearable device is not in the earphone mode, notify the terminal that the wearable device is not able to receive the voice message; and
      when the wearable device is in the earphone mode, receive the voice message sent by the terminal, wherein the voice message is obtained by converting a text message by the terminal.

20. The wearable device according to claim 19, wherein the processor is configured to determine, by using a Hall effect sensor, whether the wearable device is in the earphone mode.

21. The wearable device according to claim 19, wherein:
   the Bluetooth module is further configured to send a request for establishing an audio channel to the terminal, and
   the wearable device further comprises a receiving module configured to receive a response sent by the terminal confirming establishment of the audio channel.

22. The wearable device according to claim 19, wherein:
the Bluetooth module is further configured to:
- send a request for establishing an audio channel and a text message index to the terminal; and
- receive a response sent by the terminal confirming establishment of the audio channel.

23. The wearable device according to claim 19, wherein the Bluetooth module is further configured to:
- when the wearable device is not in the earphone mode, receive no voice message sent by the terminal.

* * * * *